W. P. GROOM.
Covering for Cotton-Bales.
No. 212,925. Patented Mar. 4, 1879.
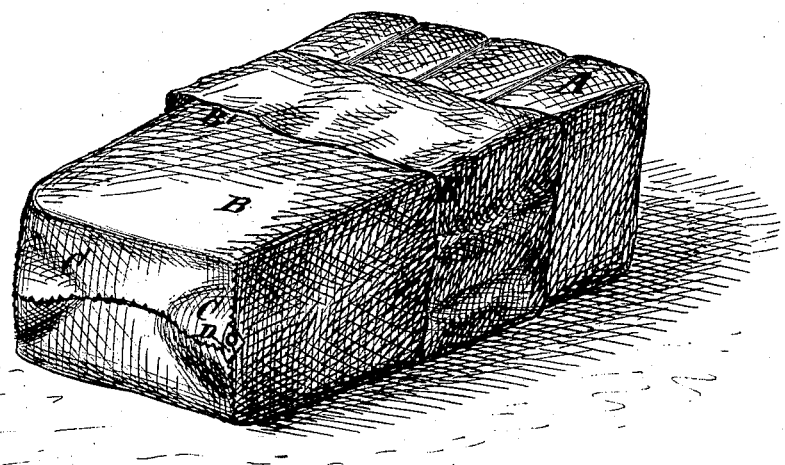
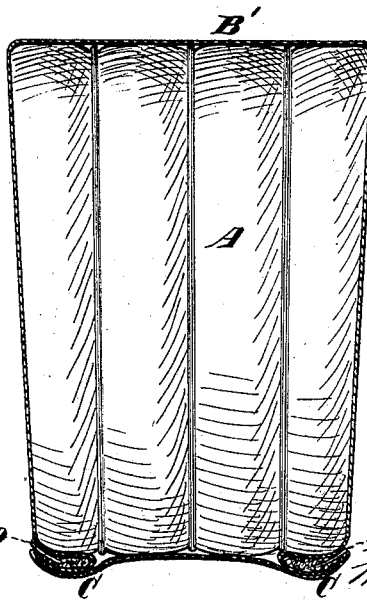

UNITED STATES PATENT OFFICE.

WALLACE P. GROOM, OF BROOKLYN, NEW YORK.

IMPROVEMENT IN COVERINGS FOR COTTON-BALES.

Specification forming part of Letters Patent No. 212,925, dated March 4, 1879; application filed October 5, 1878.

*To all whom it may concern:*

Be it known that I, WALLACE P. GROOM, of the city of Brooklyn, in the county of Kings and State of New York, have invented an Improvement in Coverings for Cotton-Bales; and I do hereby declare that the following is a full, clear, and exact description of the same, reference being had to the accompanying drawings, forming a part of this specification.

My invention has for one of its principal objects the supply of a covering for bales of cotton, wool, and other fibrous materials, which may be removed entire and without injury for subsequent use in packing the same or other materials.

The invention has also for its object the supply of means for carrying, with the bale or package, a sample of the contained material, for exhibiting the quality of the same without opening the packages or bales of the same.

The invention consists in a bale-cover made wider at its mouth than at the end opposite from the mouth, whereby, no matter how hard the material in the bale or package may be compressed, the covering may be stripped off from the said material without opening any part of the same but the mouth thereof.

The invention consists, further, in the combination, with the said covering, of a pocket or pockets, made from portions of the cloth of which the said cover is made, and a seal or seals for said pockets. The said portions of the bale-cloth, being otherwise superfluous, are ordinarily cut away and wasted; but in this way they are utilized, not only for the aforesaid pockets, but as re-enforcements for the extremity of the covering, which may, after its removal, be used for the packing of apples, potatoes, or any other kind of merchandise suitable to be packed in bags. The said coverings or bags may, therefore, be put on the market for sale at about their first cost, thus making an important saving, as the coverings of such bales as heretofore constructed and used are, after their removal, so damaged that their value is very small.

Figure 1 in the drawings represents a bale covered in accordance with my invention, and having its covering partly removed to illustrate the manner of removing the same in actual practice. Said figure also shows the pockets for samples sealed as prepared for transportation. Fig. 2 is a side view of a similar bale with the covering intact, except in vertical sections through the sample-pockets.

A, Fig. 1, represents the material baled. Said material, be it cotton, wool, or other fibrous material, is very compactly compressed and tied before the application of the covering, which is represented at B.

B' represents a portion of the said covering turned down and partly withdrawn from the bale, the mouth of the said covering being shown at B'. The said covering is made larger at its mouth than at the end opposite the mouth, and is made in the form of an open-mouthed bag and slipped over the compressed material A after the same has been compacted and tied. The bale, being then left to itself, gradually expands and fills every part of the said covering. After expanding, the entire bale has a tapered form, as shown in Fig. 2.

When it is required to remove the covering, all that is necessary is to open the mouth of the said covering and strip the same off from its contents, as indicated in Fig. 1. This is very easily and conveniently performed.

It is intended to compress and cover bales of such size that the coverings will hold about three bushels of potatoes or other loose merchandise suitable to be packed therein. In this way cotton may be so densely packed that a car may be loaded to its full capacity without having its space much more than half filled, and fibrous materials may be shipped and packed in the holds of vessels much more economically and conveniently than by other methods of packing.

When such materials are so densely packed it is impossible to sample them properly without loosening the ties under the covering, and it becomes imperative to provide a more convenient means of sampling. This I accomplish by forming pockets of the surplus stuff or bale-cloth, which would otherwise have to be cut away and wasted. The said pockets are shown at C, Figs. 1 and 2. The said pockets are made by turning in the corners of the bale-covering to make the end of the said covering fit the end of the bale. The said pockets are, moreover, provided with seals, by which means the said pockets are secured from being tampered with by those whose interest would be served by raising the quality of the sample. The said pockets are filled with a sample of the material in the bale, and, being sealed as aforesaid, they will, until opened to ascertain the quality, always contain a fair specimen of the baled material. It will be, moreover, evident that the opening of the said pockets will not necessitate the opening of the bale proper, from which, when opened, it would be very difficult, if not impossible, to extract a sample, even after the covering was removed, without also unfastening the ties which confine the said material.

Having thus described my improvement, what I claim as my invention, and desire to secure by Letters Patent, is as follows:

1. A flexible textile bale-covering consisting of a bag-shaped receptacle, wider at its mouth than at its opposite end, and closed by stitching when a bale is inserted therein, substantially as set forth, whereby, when a parallel-sided bale of pressed or compacted fibrous material is inclosed in said covering, it will be allowed to expand most at one end, to conform to the shape of the said covering, and will be easily withdrawn therefrom without necessitating the ripping of the sides thereof.

2. The combination, with a bag-shaped bale-covering, of a sample pocket or pockets formed by turning a corner or the corners of said covering, substantially as and for the purpose specified.

WALLACE P. GROOM.

Witnesses:
T. J. KEANE,
FRED. HAYNES.